United States Patent
Benezra

(10) Patent No.: US 9,960,311 B1
(45) Date of Patent: May 1, 2018

(54) ILLUMINATED ADDRESS PANEL

(71) Applicant: Isaac Benezra, West Bloomfield, MI (US)

(72) Inventor: Isaac Benezra, West Bloomfield, MI (US)

( * ) Notice: Subject to any disclaimer, the term of this patent is extended or adjusted under 35 U.S.C. 154(b) by 0 days. days.

(21) Appl. No.: 15/530,805

(22) Filed: Mar. 1, 2017

(51) Int. Cl.
*H01L 31/147* (2006.01)
*G09F 13/22* (2006.01)
*G09F 13/04* (2006.01)
*G09F 9/40* (2006.01)
*H02J 7/35* (2006.01)

(52) U.S. Cl.
CPC .............. *H01L 31/147* (2013.01); *G09F 9/40* (2013.01); *G09F 13/04* (2013.01); *G09F 13/22* (2013.01); *H02J 7/355* (2013.01); *G09F 2013/222* (2013.01)

(58) Field of Classification Search
CPC ....... G09F 9/40; G09F 13/04; G09F 2013/222
See application file for complete search history.

(56) References Cited

U.S. PATENT DOCUMENTS

| | | | | |
|---|---|---|---|---|
| 3,402,493 A * | 9/1968 | Mellyn | ................ | G02B 6/0091 40/563 |
| 5,533,288 A * | 7/1996 | Lambert | .................. | A47G 1/06 40/754 |
| 6,367,180 B2 * | 4/2002 | Weiss | ...................... | G09F 13/04 40/544 |
| 6,401,373 B1 * | 6/2002 | Sexton | .................... | G09F 13/04 40/576 |
| 7,237,351 B1 * | 7/2007 | Fehring | ..................... | G09F 1/10 40/611.01 |
| 7,578,085 B1 * | 8/2009 | Chao | ....................... | G09F 13/04 232/17 |
| 7,810,262 B2 * | 10/2010 | Sadon | ...................... | G09F 9/33 40/490 |
| 8,458,943 B2 * | 6/2013 | Horne | .................. | A47G 1/1613 248/476 |

* cited by examiner

*Primary Examiner* — Gary C Hoge
(74) *Attorney, Agent, or Firm* — Alex Rhodes

(57) ABSTRACT

An illuminated address display for a building and residence having a housing with a front wall with an inclined upper portion and vertical lower portion, solar cells on the inclined upper portion and a group of small rectangular panels suspended from the lower portion of the housing. On the small rectangular housing there is an address identifier consisting of alphanumeric digits which disclose the address of the residence or building. The alphanumeric digits have segments which extend through the panels and are backlit by light emitting diodes which are mounted on a removable cover on the bottom of the housing. Inside of the housing are batteries and a solar charge controller to prevent overcharging of the batteries and an "on/off" switch.

3 Claims, 5 Drawing Sheets

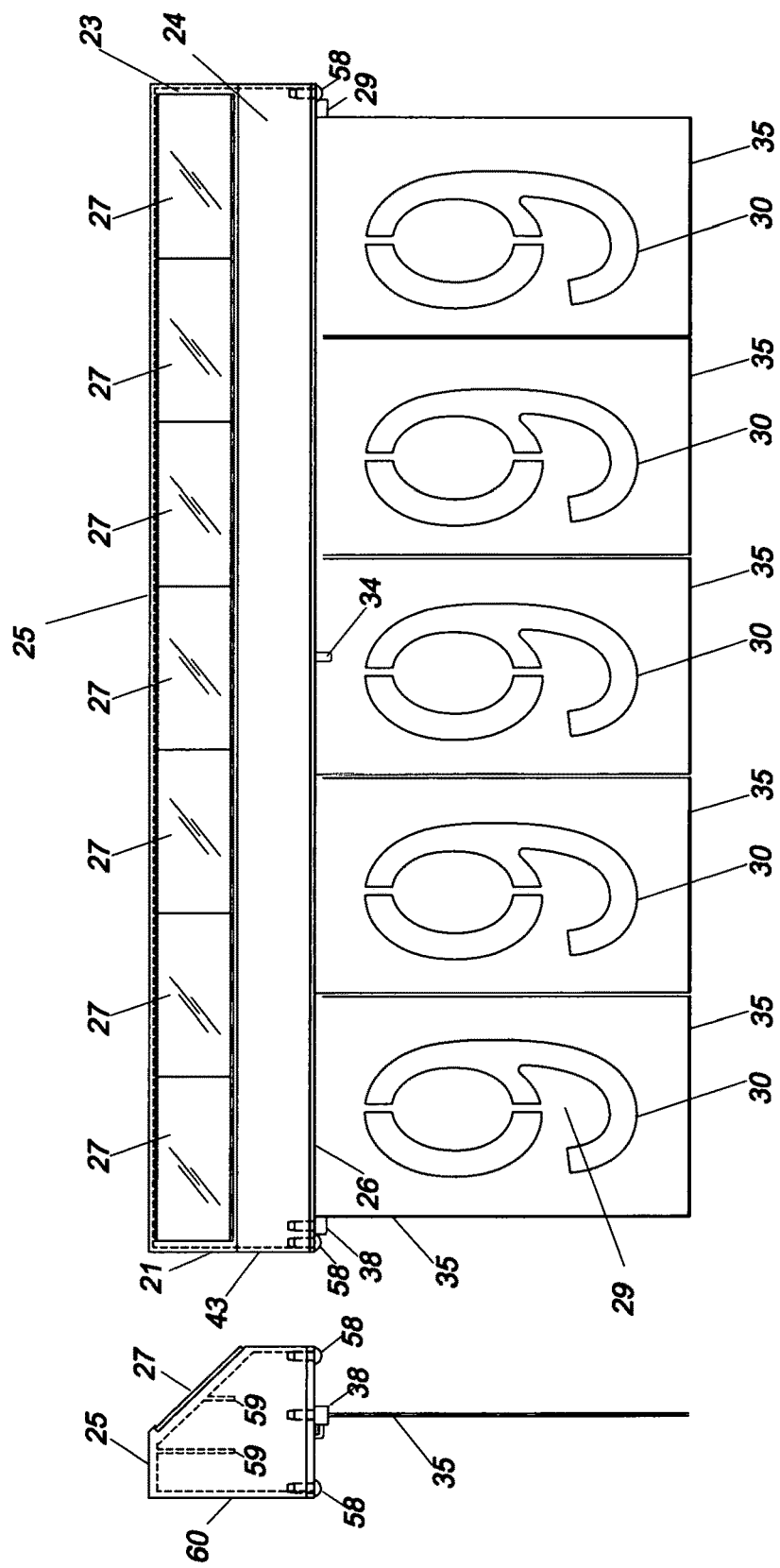

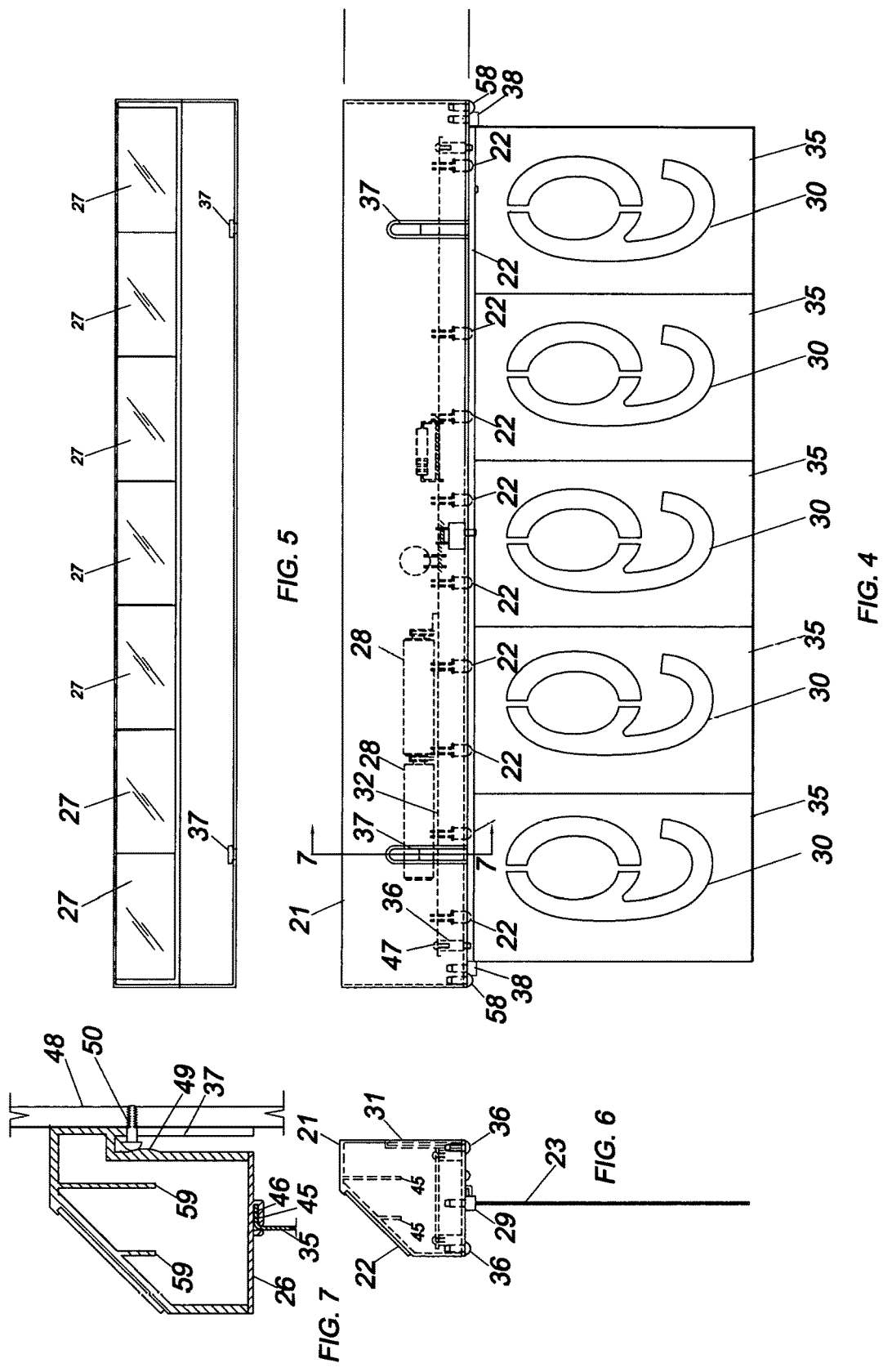

US 9,960,311 B1

ILLUMINATED ADDRESS PANEL

FIELD OF THE INVENTION

This invention relates to address panels and more particularly to an illuminated address panel for residences and buildings.

BACKGROUND OF THE INVENTION

During emergencies address displays identify locations for physicians, firemen and police. They also identify locations for visitors, delivery men and repairmen where services and deliveries are to be made. One requirement of an address panel is legibility for pedestrians and drivers of vehicles. Another requirement is a clear, unobstructed views beyond objects such as bushes and trees.

One deficiency of current address panels is that letters and numbers are not legible or visible during overcast, evening and night hours. Poor legibility and visibility can delay deliveries and interfere with responses to medical, fire, crime and police emergencies.

Illuminated address panels exist in the art. Although they provide important benefits, they are not widely used because they are expensive, difficult to install and require a reliable, uninterrupted power source.

SUMMARY OF THE INVENTION

The present invention overcomes the deficiencies in illuminated address panels by providing an uninterrupted battery/solar power supply, is relatively inexpensive and is easy to install. One feature of the invention is that illumination is supplied by long lasting light emitting diodes (LED'S).

Another feature is that the display is powered by batteries that are recharged by solar cells, a reliable inexhaustible energy source.

Another feature of the invention is that only a single housing design is necessary, whereby the labor of assembling individual addresses is supplied by the ultimate purchaser selecting alpha-numeric panels from a variety of panels that are supplied by the retailer. This reduces investment and inventory costs. Another feature of the invention is that it can be applied to a variety of building, residences and ground surfaces.

A further feature of the invention is that it can be mounted on the ground in front of a building or residence which is obscured by objects, such as bushes and trees.

The invention is comprised of an elongated horizontal housing, an array of solar cells mounted on the housing, an address identifier consisting of a group of alpha-numeric digits on small vertical panels suspended from the housing a group of light emitting diodes mounted in the housing for illuminating the address identifier and electronic circuitry that includes the solar cells for recharging batteries and a solar charge controller inside of the housing. The solar charge controller prevents the solar cells from overcharging the batteries.

A means is taught for mounting a common illuminated display on a building or the ground ahead of the residence or building.

Further objects, features and benefits of the invention will be disclosed in the ensuing detailed description of a preferred embodiment. The property in which exclusive rights are claimed is set forth in each of the numbered claims which follow the detailed description of a preferred embodiment.

BRIEF DESCRIPTION OF THE DRAWINGS

FIG. 2 is a front view of the illuminated address panel.
FIG. 3 is a right side view of the illuminated address panel.
FIG. 4 is a rear view of the illuminated address panel.
FIG. 5 is a top view of the illuminated address panel.
FIG. 6 is a left side view of the illuminated address panel.
FIG. 7 is an enlarged cross-sectional view taken on the line. 7-7 in FIG. 4.

DETAILED DESCRIPTION OF A PREFERRED EMBODIMENT

Figure 1:
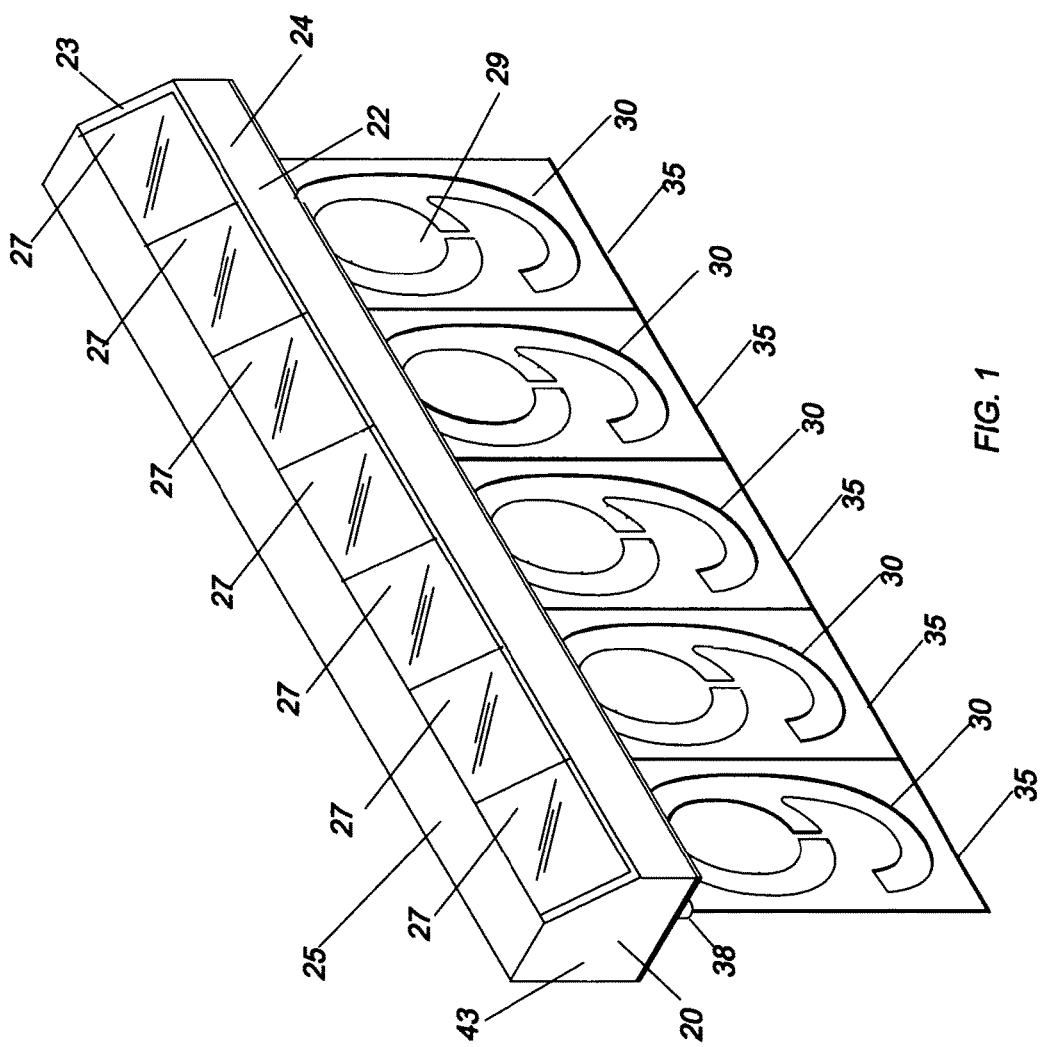
FIG. 1 is a perspective view showing the top, front and right side of an illuminated address panel.
Figure 9:
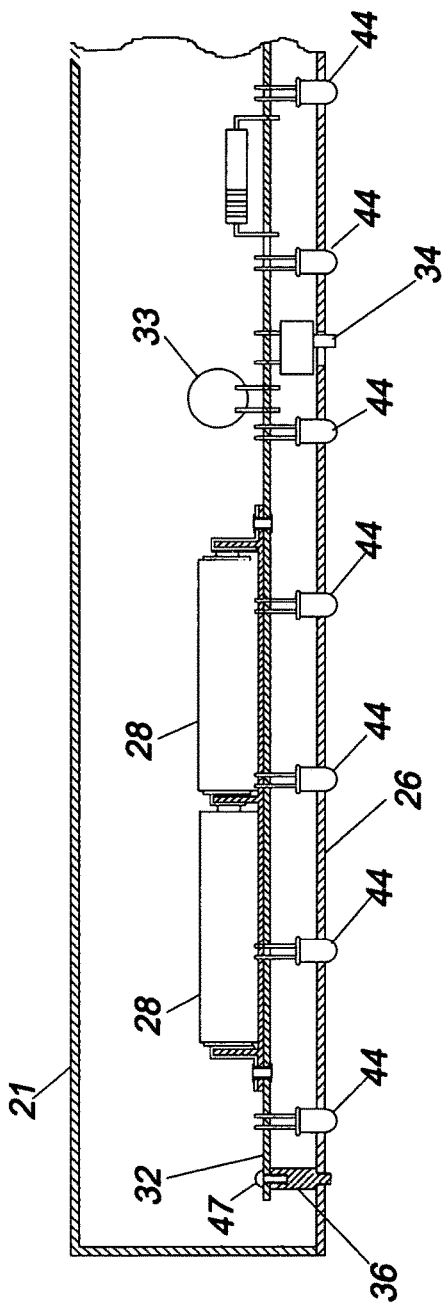
FIG. 9 is a cross-sectional view taken on the line 9-9 in FIG. 8.
Figure 8:
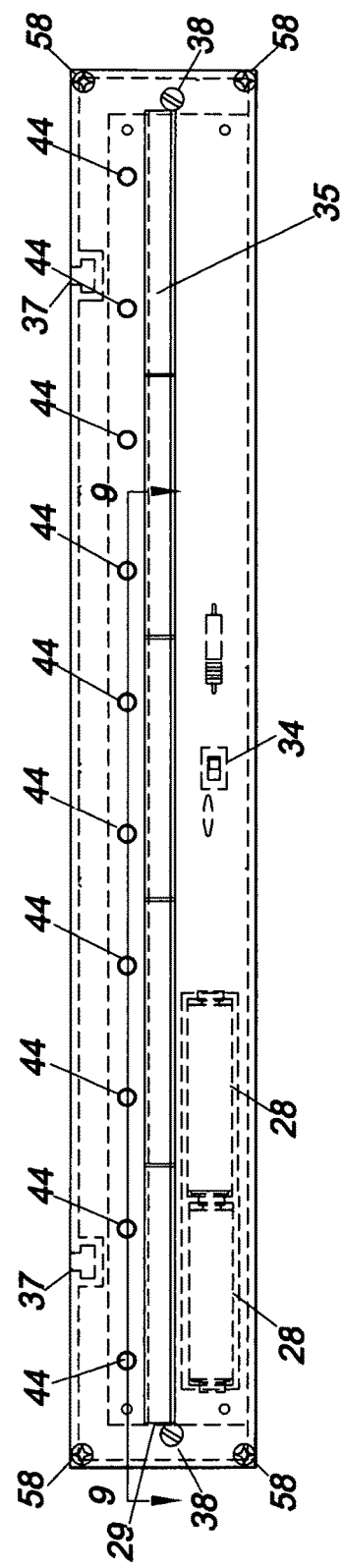
FIG. 8 is a bottom view of the illuminated address display.
Figures 10, 11:
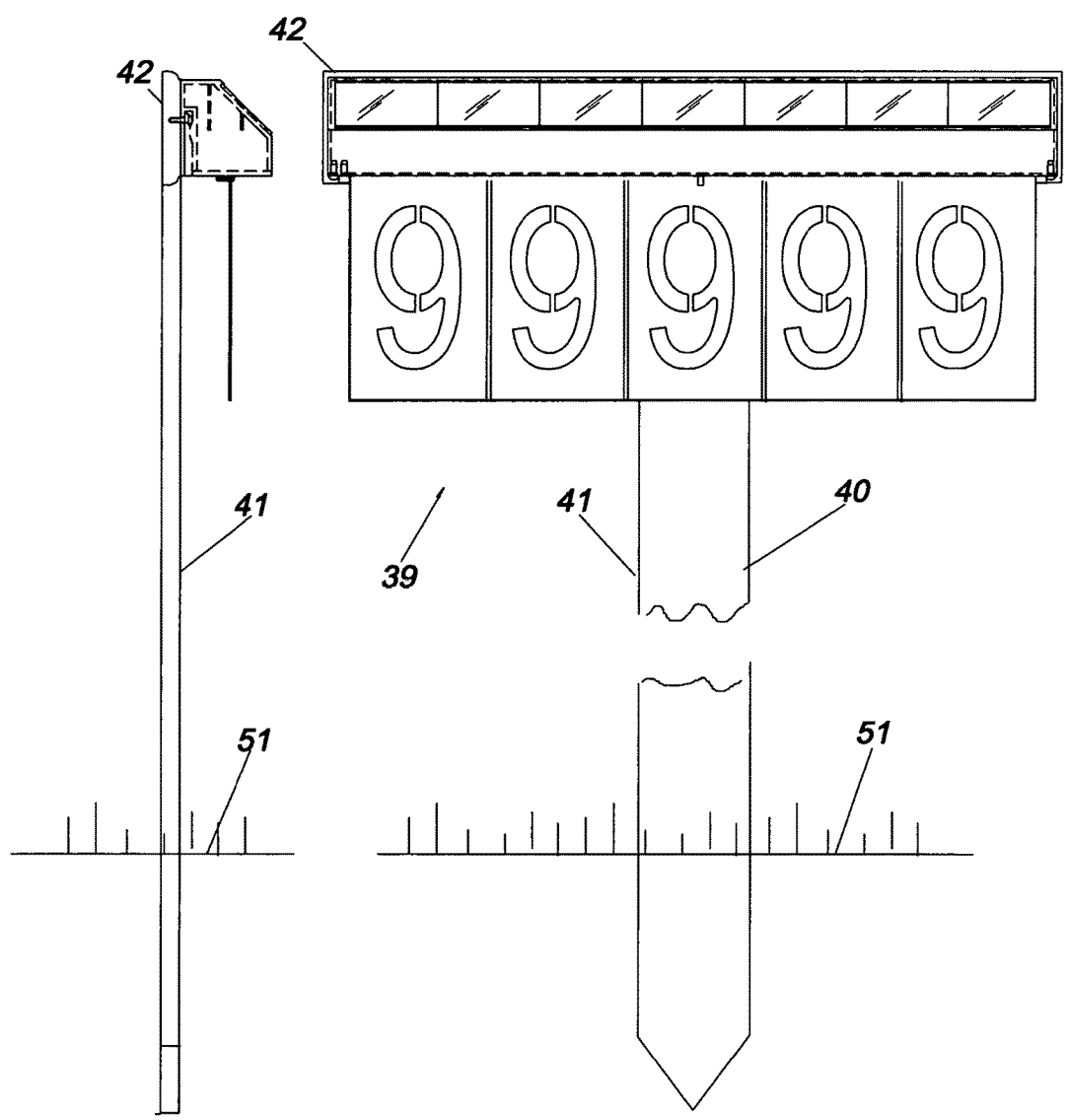
FIG. 10 is a front view of an alternate embodiment.
FIG. 11 is a right side view of the alternate embodiment.

Referring now to the drawings wherein like numerals designate like and similar parts throughout the several views, in FIG. 1 an illuminated address display 20 is shown according to the invention. With reference to FIGS. 2, 7 and 8, the address display 20 is comprised of an elongated horizontal housing 21 consisting of a front wall 22 with an inclined upper half portion 23 and a vertical lower half portion 24, spaced apart vertical side walls 43, a horizontal top wall 25 and a removable lower cover 26. Inside of the housing 21 are stiffening ribs 59 which provide rigidity to the housing 21. On the inclined front wall portion 23 of the front wall 22 there is an array of solar cells 27 for charging batteries 28 which supply current for illuminating the display 20. Suspended from the housing there is an address identifier 29 consisting of a segments which outline the digits 30 and extend through the small vertical panels 35. The "on/off" switch 34 is closed when the display 20 is placed in service.

The illuminated display 20 includes is a module 31 consisting of the lower cover 26, a printed circuit board 32 mounted on the lower cover 26, a solar charge controller 33, a pair of dry cell batteries 28 and a group of light emitting diodes 44 mounted on the lower cover 26. The lower cover 26 is retained to the housing 21 with screws 58 at the outer corners. The module 31, which is a feature of the invention, reduces costs and simplifies assembly and servicing of the display 20. The light emitting LED's 44 extend through the lower cover 26 to back light the small alpha-numeric panels 35 that extend below the housing 21. The removable cover 26 on the bottom of the housing 21 provides access to the batteries 28 and solar charge controller 33 inside of the housing 21. Extending along the bottom of the removable cover 26 is a longitudinal channel 45 which receives the upper portions 46 of the small alpha-numeric panels 35 which are suspended from the housing 21. The printed circuit board 32 is spaced upwardly from the lower cover 26 of the housing 21 by spacers 36 between the circuit board 32 and lower cover 26. The circuit board 32 is retained by the spacers 36 and screws 47 which extend through the circuit board 32 to threadably engage the lower cover 26. The upper portions 46 of the address panels 35 are horizontal flanges 46 which attach the panels 35 to the housing 21. The manner of suspending the panels 35, which itself is believed to be novel, is shown in FIG. 7. The channel 45 which extends longitudinally along the bottom surface of the lower cover is 26 parallel with the address panels 35. The upper flange portions 46 of each of the alpha-numeric panels 35 is installed into an open end of the channel 45. The numeric panels 35 are held in the channel 45 by the heads of a pair of collar screws 38 which engage the lower cover 26 at the ends of the channel. 45 After all of the panels 35 have been inserted, a collar screw 38 is installed to retain them in the channel 45.

The manner of attaching the address display 25 to a building 48 or residence is shown in FIG. 7. On the rear wall 60 of the housing 21 there is a pair of vertical channels 37 which have open lower portions. The vertical channels 37 receive the heads of screws 50 that engage the building 48 or residence. At the upper ends of the channels 37 are small obstructions 49 over which the screws 50 are forced to retain them in the channels 37.

Referring to FIGS. 9 through 12, an embodiment 39 is shown for use at locations where buildings 48 or residences are obscured by objects, such as bushes and trees. A bracket 40 is provided for mounting the display 20 on a ground surface 51. The bracket 40 is comprised of a slender vertical post 41 which is driven by force into the ground 51 and an upper horizontal cross member 42 is provided for attaching the address display 20 has been previously described. The manner of attaching the address display 20 to the bracket 40 is the same as described for a building 48 or residence.

From the above it will be appreciated that my invention provides benefits and features in an illuminated address panel heretofore unavailable. My illuminated address panel provides a relatively inexpensive means for displaying addresses during conditions of low or no visibility, that is maintenance free ad is easy to install. Although I have disclosed a single preferred embodiment, it will be appreciated that many embodiments an be provided by making changes such are substitution of parts, elimination of parts and such trivial changes such a changes in the shape of parts without departing from the spirit thereof.

What I claim is new is:

1. An illuminated address display for a building and residence comprising a housing having a top wall, spaced apart side walls, a front wall with an upper inclined top portion and a lower vertical portion, a rear wall and a removable cover for enclosing an open lower portion of said housing; an array of solar cells on said inclined upper surface of said front wall; a module for illuminating alpha-numeric digits of said illuminated address display, said module comprised of said lower cover and a printed circuit board, at least one dry cell battery, electronic components, including an "on/off" switch, other electronic components and light emitting diodes (LED's) mounted on said printed board, said lower cover further having a longitudinal channel for suspending small rectangular panels containing said alpha-numeric digits extending through said panels, each of said small rectangular panels having an upper horizontal flange portion in said cover longitudinal channel and a lower vertical portion containing one of said alpha-numeric digits, said light emitting diodes (LED's) back lighting said alpha-numeric digits.

2. An illuminated address display wherein said illuminated address display is for mounting on a ground surface a means for mounting said display on said ground surface is comprised of a pair of open channels on a rear wall portion of an elongated horizontal housing of said illuminated address display and a bracket, said bracket having a slender vertical portion, said vertical portion having a lower poined portion, and a slender upper horizontal portion, and a pair of spaced apart self threading screws engaging said slender upper horizontal bracket portion, said screws having head portions engaging said channels on said rear wall of said housing, said illuminated address display further comprised of an array of solar cells on said horizontal elongated housing for illuminating small rectangular panels suspended from said elongated horizontal housing, each of said small rectangular panels having a "see-through" alpha-numeric digit extending through said panel, light emitting diodes for back lighting said alpha-numeric digit, a module for supplying power to said LED's, said module including at least one battery, and an electronic circuit for charging said battery; light emitting diodes (LED's), for back lighting said alpha-numeric digits, and a power charging module for supplying power to said LED's, said module including at least one battery, and an electronic circuit for charging said battery, and a means for mounting said illuminated address display on a residence or building.

3. An illuminated address display for a building and residence comprising an elongated horizontal housing; an array of solar cells on said horizontal housing for illuminating small rectangular panels suspended from said housing, each of said small rectangular housing having an alpha-numeric digit extending through said panel; light emitting diodes (LED's) extending through a bottom of said housing for back lighting said alpha-numeric digits; and a module for illuminating said alpha-numeric digits, said module comprising at least one battery for supplying power to said LED's, an electronic charging circuit for charging said battery; said solar cells and a solar charge circuit; and a means for mounting said illuminated address display on the ground in front of a residence or building.

* * * * *